United States Patent
Wade et al.

(10) Patent No.: US 8,701,352 B2
(45) Date of Patent: Apr. 22, 2014

(54) TWO-SHOT SECONDARY SEAL WITH CLIP

(75) Inventors: David Arthur Wade, Plymouth, MI (US); Steve William Gallagher, Bloomfield Hills, MI (US); Marius A. Mitrofan, Troy, MI (US); Tad J. Siedlecki, Dearborn, MI (US); Georgette Eaton, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 13/233,405

(22) Filed: Sep. 15, 2011

(65) Prior Publication Data

US 2013/0067822 A1   Mar. 21, 2013

(51) Int. Cl.
*E06B 7/16* (2006.01)

(52) U.S. Cl.
USPC .......................................................... 49/493.1

(58) Field of Classification Search
USPC ............ 49/475.1, 492.1, 493.1, 490.1, 495.1, 49/498.1
See application file for complete search history.

(56) References Cited

U.S. PATENT DOCUMENTS

| | | | | |
|---|---|---|---|---|
| 3,159,886 | A * | 12/1964 | Lynch ............................ | 49/479.1 |
| 3,545,157 | A * | 12/1970 | Treber et al. ................. | 52/718.01 |
| 5,085,006 | A | 2/1992 | Hayashi et al. | |
| 5,159,781 | A * | 11/1992 | Glossop et al. ................ | 49/375 |
| 6,247,271 | B1 | 6/2001 | Fioritto et al. | |
| 6,416,875 | B1 * | 7/2002 | Parsons et al. ................ | 428/517 |
| 6,623,832 | B2 * | 9/2003 | Greven ........................... | 428/121 |
| 6,752,950 | B2 | 6/2004 | Clarke | |
| 6,916,145 | B2 | 7/2005 | Lydan | |
| 6,935,072 | B2 * | 8/2005 | Kogiso et al. ................ | 49/490.1 |
| 7,178,856 | B2 * | 2/2007 | Saito ........................... | 296/146.9 |
| 7,198,315 | B2 | 4/2007 | Cass et al. | |
| 7,363,749 | B2 * | 4/2008 | Sultan et al. ................. | 49/490.1 |
| 7,364,218 | B2 | 4/2008 | Radu et al. | |
| 7,726,075 | B2 | 6/2010 | Gross et al. | |
| 8,286,389 | B2 * | 10/2012 | Lichtner et al. .............. | 49/490.1 |
| 2004/0043188 | A1 * | 3/2004 | Tsujiguchi ..................... | 428/122 |
| 2005/0112301 | A1 * | 5/2005 | Omori et al. ..................... | 428/31 |
| 2005/0136199 | A1 * | 6/2005 | Aoki et al. ..................... | 428/34.1 |
| 2007/0209313 | A1 * | 9/2007 | Willett ......................... | 52/716.8 |
| 2008/0052878 | A1 | 3/2008 | Lewis et al. | |
| 2008/0178532 | A1 * | 7/2008 | Leung ........................... | 49/490.1 |
| 2009/0186217 | A1 * | 7/2009 | Brzoskowski et al. ........ | 428/339 |
| 2009/0258209 | A1 * | 10/2009 | Jacob et al. ..................... | 428/220 |
| 2011/0162285 | A1 * | 7/2011 | Lichtner et al. .............. | 49/490.1 |

OTHER PUBLICATIONS

Snap fit, courtesy of MIT.*
"Automotive Weather-Strip Seal," IPCOM000177604D, Dec. 19, 2008, www.ip.com, http://priorartdatabase.com/IPCOM/000177604#, 2 pages.
Long Term Weather, "Weather Strip Having Variable Length Holding Lip," web site printout, http://www.bcrossings.org/weather-strip-having-variable-length-holding-lip/, 2 pages, copyrighted 2011 Long Term Weather.
Body Exterior, "Two-Shot, Interior Sound Reduction Door Seal 2004 Ford F150 Truck," web site printout, http://www.speautomotive.com/Awarde%20Modules/2003Awards/Body_Exterior/interiorsoundseal.htm, 3 pages.

* cited by examiner

*Primary Examiner* — Katherine Mitchell
*Assistant Examiner* — Scott Denion
(74) *Attorney, Agent, or Firm* — Raymond Coppiellie; Price Heneveld LLP

(57) ABSTRACT

A seal for an automobile body opening comprising a plastic carrier, an elastomeric bulb operably connected to the plastic carrier, and a plastic clip operably connected to, and extending away from, the plastic carrier for engagement to a flange for retaining the seal to the flange.

20 Claims, 1 Drawing Sheet

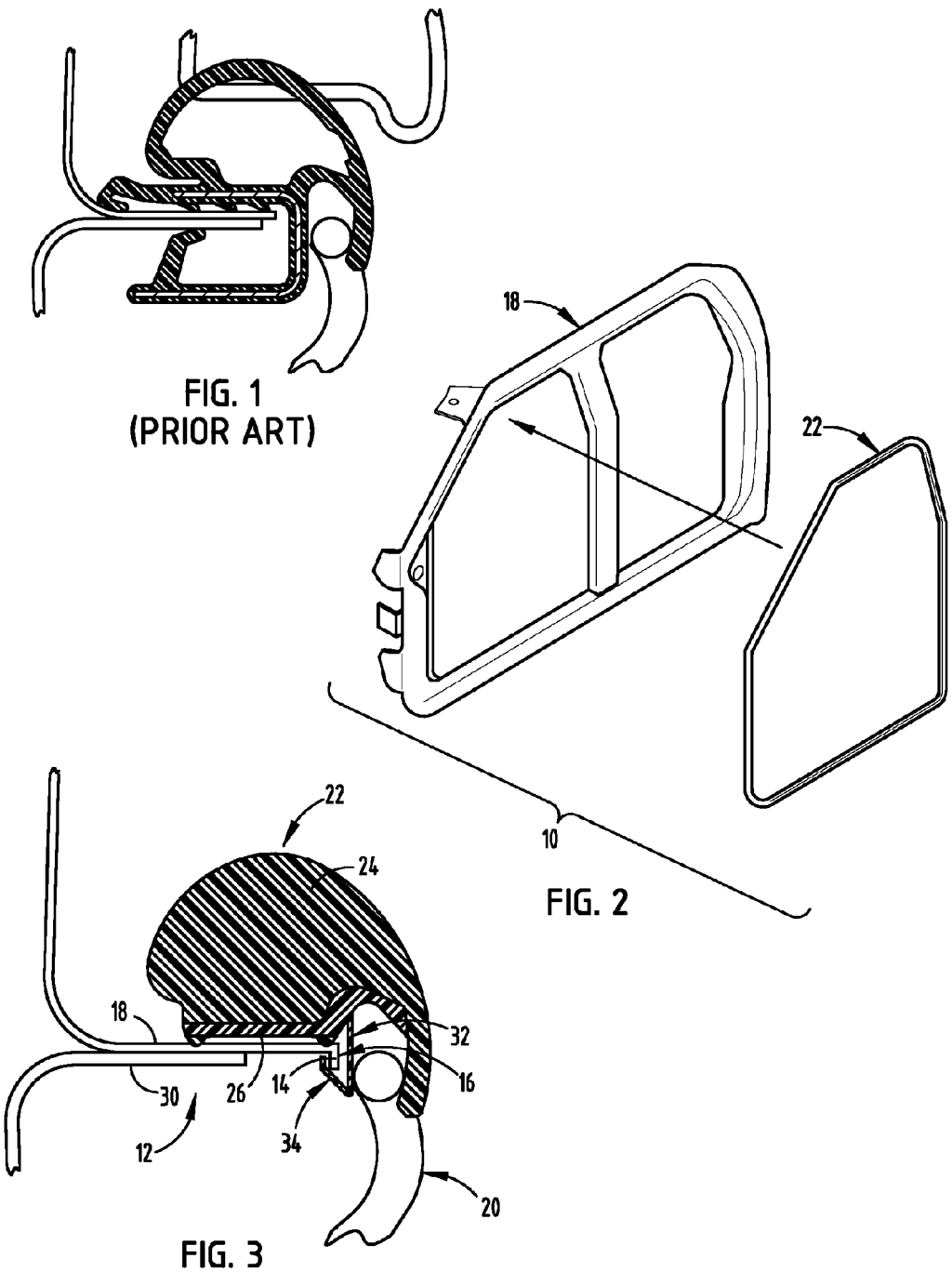

TWO-SHOT SECONDARY SEAL WITH CLIP

FIELD OF THE INVENTION

The present invention generally relates to seals for vehicles, and more particularly to flange engaging seals.

BACKGROUND OF THE INVENTION

Automotive seals are often employed around the perimeter of automobile openings. Such openings typically include a flange that is mounted on both sides by a seal comprising a plurality of ribs. Such seals (FIG. 1) include a hard, usually metal, carrier insert to provide structural rigidity to the seal. Such seals are not-well-suited to account for flange thickness variations that are inherently present during manufacturing processes.

Accordingly, an automotive seal is desired having the aforementioned advantages and solving and/or making improvements on the aforementioned disadvantages.

SUMMARY OF THE INVENTION

One aspect of the present invention includes a seal for an automobile body opening comprising a plastic carrier, an elastomeric bulb operably connected to the plastic carrier, and a plastic clip operably connected to, and extending away from, the plastic carrier for engagement to a flange for retaining the seal to the flange.

Another aspect of the present invention includes an automobile body opening comprising a flange. Also included is a seal having a plastic carrier, an elastomeric bulb portion operably connected to the plastic carrier, wherein the plastic carrier includes a plastic clip that extends away from the plastic carrier and engages an edge of the flange for retaining the seal to the flange.

Yet another aspect of the present invention includes a method for sealing a perimeter of an automobile body opening comprising a flange proximate the perimeter of the automobile body opening integrally forming a seal comprising a plastic carrier and an elastomeric bulb portion by a multi-shot injection molding process, wherein the plastic carrier includes a clip and securing the seal to the flange by snap-fitting the clip over an edge of the flange.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 1 is a cross-sectional view of a prior seal having a metal carrier;

FIG. 2 is a top, perspective view of an automobile body for receiving a seal of the present invention; and FIG. 3 is a cross-sectional view of the seal of the present invention mounted to a flange of the automobile body.

DETAILED DESCRIPTION OF PREFERRED EMBODIMENTS

For purposes of description herein, the terms "upper," "lower," "right," "left," "rear," "front," "vertical," "horizontal," and derivatives thereof shall relate to the automobile opening illustrated in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 2 and 3) generally designates an opening of a vehicle body, such as that of a daylight opening. The opening 10 includes a flange 12 that is typically formed of one or more pieces of sheet metal that extends from the opening 10. The flange extends around at least part of, but typically around the entire perimeter of the opening, which may be defined by the automobile body and/or various automotive components including, but not limited to, a headliner and interior trim 20.

The flange 12 includes a rib 14 located proximate a distal end 16 of the flange 12. The rib 14 extends substantially perpendicularly to the general plane of the flange 12 and may have manufacturing thickness variations of approximately six (6) millimeters (mm). The rib 14 is located on the outer panel 18 of the flange 12 and is configured to accommodate a push-on seal 22. The rib 14 typically juts inboard toward the inner panel 30 of the flange 12.

The seal 22 is a multi-shot injection molded seal that is comprised of a low durometer elastomeric bulb seal 24 bonded to a hard plastic carrier ring 26 that follows the flange 12 and defines the opening 10 for a side door (not illustrated), in one configuration. The plastic carrier ring 26 may be formed of at least one of the materials polypropylene talc-filled (PP-TF20) and a thermoplastic elastomer (TPE). The elastomeric bulb seal 24 may be formed of a thermoplastic vulcanizate (TPV) having a durometer of approximately 30 Shore A or less. The multi-shot injection molding process of the elastomeric bulb seal 24 and the plastic carrier ring 26 may be a two-shot injection molding process.

The seal also includes a plastic clip 32 that is configured to snap-fittingly engage the rib 14 of the flange 12. The plastic clip may be formed of various geometric configurations, but typically will comprise a hook-like end 34 that surroundingly and engagingly fits around the rib 14 of the flange 12. This engagement, combined with that of the elastomeric bulb seal 24 to the headliner or interior trim 20 (or other suitable automotive component) facilitates a secure retaining force between the seal 22 and the opening 10 of the automobile.

A method of sealing a perimeter of the opening 10 by the seal 22 is also provided, where the seal 22 is snap-fitted to the flange 12 and the headliner or interior trim 20.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An automobile body having a panel with an opening, comprising:
    a flange surrounding a perimeter of the opening and protruding orthogonally from the panel to define a distal end away from the panel, wherein the flange has a rib protruding substantially perpendicular from the distal end of the flange; and
    a seal that operably engages the flange and comprises:
        a plastic carrier;
        an elastomeric bulb disposed on an exterior surface of the plastic carrier; and
        a plastic clip having a hook shape that extends from an interior surface of the plastic carrier to resiliently snap-fit into direct engagement with the rib.

2. The automobile body of claim 1, wherein the flange includes an inner panel operably coupled to an outer panel, and wherein the rib integrally extends inboard from the outer panel beyond the inner panel.

3. The automobile body of claim 2, wherein the rib extends substantially perpendicular from the distal end of the flange to define an L-shape.

4. The automobile body of claim 1, wherein the elastomeric bulb comprises a low durometer material relative to the plastic carrier and the plastic clip.

5. The automobile body of claim 4, wherein the elastomeric bulb comprises Thermoplastic Vulcanizate (TPV).

6. The automobile body of claim 1, wherein the plastic carrier and the elastomeric bulb are integrally formed by two-shot injection molding.

7. The automobile body of claim 1, wherein the plastic clip comprises a thermoplastic elastomer.

8. An automobile body with an opening, comprising:
an inner panel;
an outer panel coupled with the inner panel around the opening to define an upstanding flange, wherein a distal end of the flange terminates away from the inner and outer panels;
a rib protruding substantially perpendicularly from the outer panel at the distal end of the flange to form an L-shaped cross section; and
a seal comprising a rigid carrier that engages the outer panel, an elastomeric bulb portion disposed on the rigid carrier, and a rigid clip that extends from the rigid carrier in a hook shape and resiliently snap-fits into engagement with the rib for retaining the seal to the flange.

9. The automobile body of claim 8, wherein the rigid carrier is positioned between the outer panel of the flange and the elastomeric bulb portion.

10. The automobile body of claim 9, wherein the elastomeric bulb portion is comprised of a low durometer material relative to the rigid carrier and the rigid clip, and wherein the elastomeric bulb portion follows the rigid carrier around the opening to receive a side door.

11. The automobile body of claim 8, wherein the elastomeric bulb portion comprises a uniform material with a solid core.

12. The automobile body of claim 11, wherein the elastomeric bulb portion is configured to retain an interior trim component between the rigid clip and a segment of the elastomeric bulb portion.

13. The automobile body of claim 8, wherein the rigid carrier and the elastomeric bulb are integrally formed by two-shot injection molding.

14. The automobile body of claim 8, wherein the rigid clip comprises a thermoplastic elastomer.

15. An automobile body with an opening, comprising:
outer and inner panels coupled about the opening to define a flange extending therefrom and terminating at an end;
a rib protruding at the end substantially perpendicularly from the outer panel toward the inner panel; and
a seal engaging the flange and comprising:
a carrier having a hook-shaped clip that resiliently snap-fittingly engages the rib; and
an elastomeric bulb disposed on the carrier.

16. The automobile body of claim 15, wherein the elastomeric bulb has a low hardness relative to the carrier for engaging a side door received in the opening.

17. The automobile body of claim 16, further comprising:
an interior trim piece that engages the seal; and
a lip portion of the elastomeric bulb that extends inward, wherein the interior trim piece engages the seal between the clip and a lip portion of the elastomeric bulb.

18. The automobile body of claim 17, wherein the rib together with the outer panel define an L-shape proximate the end of the flange.

19. The automobile body of claim 15, wherein the carrier and the elastomeric bulb are integrally formed by two-shot injection molding.

20. The automobile body of claim 15, wherein the carrier and the elastomeric bulb are integrally formed by two-shot injection molding, wherein the carrier is comprised of Polypropylene Talc-Filled (PP-TF20) and the elastomeric bulb is comprised of Thermoplastic Vulcanizate (TPV).

* * * * *